(12) United States Patent
Choi et al.

(10) Patent No.: US 12,524,150 B2
(45) Date of Patent: Jan. 13, 2026

(54) STORAGE DEVICE AND STORAGE SYSTEM CAPABLE OF CONTROLLING HUMIDITY, AND OPERATION METHOD THEREOF

(71) Applicant: Samsung Electronics Co., Ltd., Suwon-si (KR)

(72) Inventors: Jaewoong Choi, Suwon-si (KR); Dongyoung Lee, Suwon-si (KR); Dasol Park, Suwon-si (KR); Jinsoo Bae, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 77 days.

(21) Appl. No.: 18/337,790

(22) Filed: Jun. 20, 2023

(65) Prior Publication Data
US 2024/0134520 A1 Apr. 25, 2024
US 2024/0231611 A9 Jul. 11, 2024

(30) Foreign Application Priority Data

Oct. 24, 2022 (KR) ........................ 10-2022-0137359

(51) Int. Cl.
*G06F 3/06* (2006.01)
(52) U.S. Cl.
CPC .......... *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 6,564,288 B2 | 5/2003 | Olarig et al. | |
| 7,719,792 B2 | 5/2010 | Strom et al. | |
| 8,078,918 B2 | 12/2011 | Diggs et al. | |
| 9,152,568 B1 | 10/2015 | Seigler et al. | |
| 9,839,162 B2 | 12/2017 | Crawford | |
| 10,004,165 B1 | 6/2018 | Bailey et al. | |
| 2007/0165322 A1* | 7/2007 | Strom | G11B 33/144 |
| | | | 219/209 |
| 2013/0227268 A1* | 8/2013 | Ichida | H10N 10/00 |
| | | | 713/100 |
| 2014/0181585 A1 | 6/2014 | Hoang et al. | |
| 2017/0071056 A1* | 3/2017 | Stoev | G11C 7/04 |
| 2019/0339881 A1* | 11/2019 | Scott, III | G06F 3/0619 |
| 2020/0097217 A1* | 3/2020 | Yeh | G11C 16/10 |
| 2020/0394115 A1* | 12/2020 | Pao | G11C 11/4072 |
| 2021/0208793 A1 | 7/2021 | Nave et al. | |

* cited by examiner

*Primary Examiner* — Prasith Thammavong
*Assistant Examiner* — Edmund H Kwong
(74) *Attorney, Agent, or Firm* — HARNESS, DICKEY & PIERCE, P.L.C.

(57) ABSTRACT

A storage device may include a memory, a humidity sensor that collects humidity information of the storage device, and a storage controller that performs a heating operation set to increase a temperature of the storage device through the memory if a humidity value of the humidity information exceeds a reference humidity value.

20 Claims, 14 Drawing Sheets

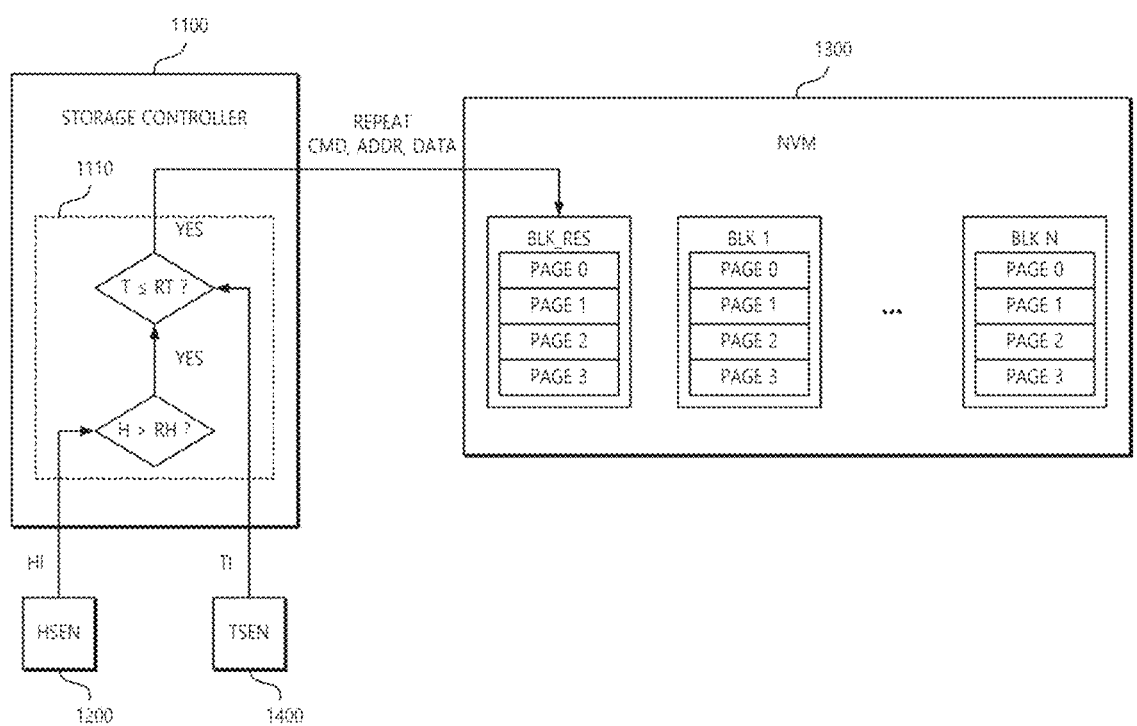

| STORAGE DEVICE | ARP ADDRESS | PHYSICAL LOCATION |
|---|---|---|
| STORAGE DEVICE #1 | ADDRESS_1 | PL_1 |
| STORAGE DEVICE #2 | ADDRESS_2 | PL_2 |
| STORAGE DEVICE #3 | ADDRESS_3 | PL_3 |

ARP TABLE

STORAGE DEVICE AND STORAGE SYSTEM CAPABLE OF CONTROLLING HUMIDITY, AND OPERATION METHOD THEREOF

CROSS-REFERENCE TO RELATED APPLICATIONS

This application claims priority under 35 U.S.C. § 119 to Korean Patent Application No. 10-2022-0137359, filed on Oct. 24, 2022 in the Korean Intellectual Property Office, the disclosures of which are incorporated by reference herein in their entireties.

BACKGROUND

Embodiments of the present disclosure relate to a storage device, a storage system including the same, and a method of operating the same.

In the field of memory storage, storage devices used in mass storage systems such as data centers or server rooms that store large amounts of memory may be subject to defects due to dust, moisture absorption, or corrosion depending on use. This may be considered to be due to differences in temperature or humidity depending on the locations of individual servers included in the data center or the server room.

SUMMARY

Embodiments of the present disclosure provide a storage device capable of controlling humidity for each storage device by including a humidity sensor in the storage device, a storage system including the same, and a method of operating the same.

According to an embodiment of the present disclosure, a storage device may include a non-volatile memory; a buffer memory configured to buffer data to be written to the non-volatile memory or data read from the non-volatile memory; a humidity sensor configured to collect humidity information of the storage device; and a storage controller configured to perform a heating operation set to increase a temperature of the storage device through the memory if a humidity value of the humidity information exceeds a reference humidity value. The heating operation may include at least one of an operation of dumping data stored in the buffer memory to the non-volatile memory and an operation of performing one or more of a write, a read, or an erase through the non-volatile memory.

In some embodiments, the storage device may further include a temperature sensor configured to collect temperature information of the storage device.

In some embodiments, the storage controller may be configured to perform the heating operation only if a temperature value of the temperature information is less than or equal to a reference temperature value.

In some embodiments, the storage controller may be configured to notify a host device connected to the storage device that a humidity control is required if a temperature value of the temperature information exceeds a reference temperature value.

In some embodiments, the storage device may be configured to receive an address mapped to a physical location of the storage device from a host device connected to the storage device.

In some embodiments, the storage controller may be configured to repeatedly perform the heating operation until the humidity value is equal to or less than the reference humidity value.

In some embodiments, the storage controller may be configured to repeatedly perform the heating operation for a time period, and may be configured to notify a host device connected to the storage device that a humidity control is required if the humidity value exceeds the reference humidity value when the time period is expired.

According to an embodiment of the present disclosure, a method of operating a storage device may include a collecting humidity information of the storage device; determining whether a humidity value of the humidity information exceeds a reference humidity value; and performing a heating operation set to increase a temperature of the storage device if the humidity value exceeds the reference humidity value. The storage device may include a buffer memory and non-volatile memory. The heating operation may include at least one of an operation of dumping data stored in the buffer memory to the non-volatile memory and an operation of performing one or more of a write, a read, or an erase through the non-volatile memory.

According to an embodiment of the present disclosure, a storage system includes may include a host device and a plurality of storage devices. Each of the plurality of storage devices may include a non-volatile memory, a buffer memory configured to buffer data to be written to the non-volatile memory or data read from the non-volatile memory, a humidity sensor configured to collect humidity information of the storage device, and a storage controller configured to perform a heating operation set to increase a temperature of the storage device through the non-volatile memory if a humidity value of the humidity information exceeds a reference humidity value. The heating operation may include at least one of an operation of dumping data stored in the buffer memory to the non-volatile memory and an operation of performing one or more of a write, a read, or an erase through the non-volatile memory. The host device may be configured to control the plurality of storage devices.

In some embodiments, the host device may assign an address mapped to a physical location of a corresponding one of the plurality of storage devices to the corresponding one of the plurality of storage devices, and the host device may be configured to control the heating operation of the plurality of storage devices for physical locations corresponding to the plurality of storage devices.

BRIEF DESCRIPTION OF THE FIGURES

A detailed description of each drawing is provided to facilitate a more thorough understanding of the drawings referenced in the detailed description of the present disclosure.

FIGS. 3A to 3C are diagrams for describing a heating operation, according to various embodiments.

DETAILED DESCRIPTION

Hereinafter, embodiments of the present disclosure may be described in detail and clearly to such an extent that one of ordinary skill in the art easily may implement embodiments of the present disclosure.

Figure 1:
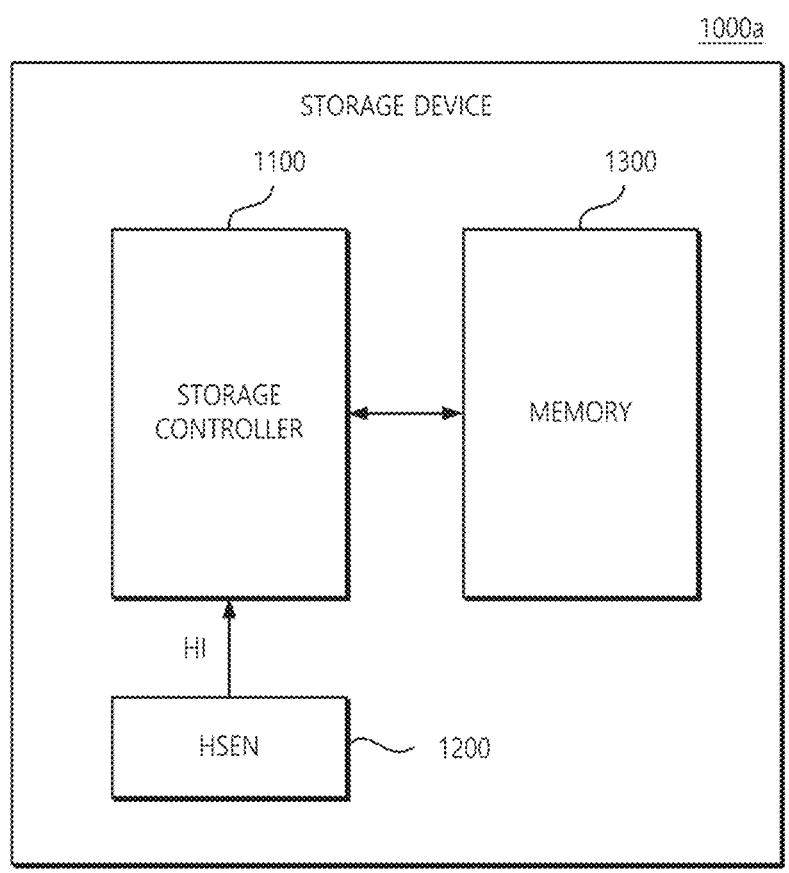
FIG. 1 illustrates a storage device, according to an embodiment of the present disclosure.

FIG. 1 illustrates a storage device, according to an embodiment of the present disclosure.

Referring to FIG. 1, a storage device 1000a according to an embodiment includes a storage controller 1100, a humidity sensor 1200 connected to the storage controller 1100, and a memory 1300.

In an embodiment, the storage device 1000a may be an SSD, a UFS, or an eMMC. Alternatively, in an embodiment, the storage device 1000a may be implemented with a Secure Digital (SD) card, a micro SD card, a memory stick, a chip card, a Universal Serial Bus (USB) card, a smart card, a Compact Flash (CF) card, or a form similar thereto, and is not limited to the above-described embodiments.

In an embodiment, the storage device 1000a may be implemented in 3.5 inches, 2.5 inches, 1.8 inches, M.2, U.2, U.3, EDSFF (Enterprise and Data Center SSD Form Factor), NF1 (New Form Factor 1), and/or a form factor similar thereto.

In an embodiment, the storage device 1000a may be implemented in a small computer system interface (SATA), a small computer system interface (SCSI), a serial attached SCSI (SAS), and/or an interface similar thereto, and may be implemented in a peripheral component interconnect (PCI), a PCI express (PCIe), a non-volatile Memory Express (NVMe), an NVMe-over-Fabrics (NVMe-oF), an Ethernet, an InfiniBand, a Fiber Channel, and/or a protocol similar thereto.

The storage controller 1100 controls overall operations of the storage device 1000a.

The storage controller 1100 may control the memory 1300 connected to the storage controller 1100 according to a host device connected to the storage device 1000a. The storage controller 1100 may perform, for example, a read operation, a write operation, or an erase operation with respect to the memory 1300 by providing addresses, commands, and control signals to the memory 1300. In an embodiment, the storage controller 1100 may repeatedly perform various operations with respect to the memory 1300 based on addresses, commands, and control signals on the basis of dynamic humidity throttling or dynamic temperature throttling.

In the present disclosure, the dynamic humidity throttling may control an overall operation of the storage device 1000a such that the storage device 1000a operates within an appropriate humidity range according to humidity information HI of the storage device 1000a. In addition, the dynamic temperature throttling may control an overall operation of the storage device 1000a such that the storage device 1000a operates within an appropriate temperature range according to temperature information of the storage device 1000a. The dynamic humidity throttling and the dynamic temperature throttling may be performed individually or cooperatively.

The humidity sensor 1200 connected to the storage controller 1100 collects the humidity information HI of the storage device 1000a and transfers the collected humidity information HI to the storage controller 1100. For example, the humidity sensor 1200 may periodically or non-periodically sense a humidity value of the storage device 1000a and output the humidity information HI representing the sensed humidity value to the storage controller 1100.

The memory 1300 may be controlled by the storage controller 1100 and may include at least one of a volatile memory and a non-volatile memory. According to various embodiments, the memory 1300 may include at least one volatile memory and/or at least one non-volatile memory.

According to the humidity value of the humidity information HI output by the humidity sensor 1200, the storage controller 1100 and the memory 1300 may perform the dynamic humidity throttling.

As an example, when the humidity value exceeds a reference humidity value, the storage controller 1100 may perform various heating operations set to increase the temperature of the storage device 1000a through the memory 1300. Temperature of surroundings of the storage device 1000a and temperature of the storage device 1000a may rise according to a heating operation of the storage controller 1100 and the memory 1300, and thus the relative humidity around the storage device 1000a and the relative humidity of the storage device 1000a may decrease. When the humidity value is less than or equal to the reference humidity value, the storage controller 1100 may continuously monitor the humidity information HI.

As an example, the storage controller 1100 may repeatedly perform the heating operation until the humidity value becomes equal to or less than the reference humidity value.

In the present disclosure, the heating operation may include various operations for increasing the temperature of the storage device 1000a and the temperature of the surroundings of the storage device 1000a.

The storage controller 1100 may perform various memory driving operations to increase the temperature of at least a portion or a region of the memory 1300 as the heating operation. The heating operation may be implemented through internal hardware and/or hardware and software (e.g., firmware) of the storage device 1000a.

As an example, the storage controller 1100 may repeatedly perform a read, write, or erase operation with respect to the memory 1300. For example, when the memory 1300 includes a plurality of volatile memories and a plurality of non-volatile memories as described above, the storage controller 1100 repeatedly performs read, write, or erase operations with respect to a portion of the memory 1300. As a result, power of the storage device 1000a is additionally consumed, and thus additional thermal energy may be generated. For example, a portion of the memory 1300 may be allocated as a reserved memory for the above-described heating operation, which is the memory 1300 for the heating operation.

As an example, the erase operation may be performed through a garbage collection. The storage controller 1100 may increase the temperature of the storage device 1000a by repeatedly performing the garbage collection with respect to the memory 1300. For example, a specific block for the garbage collection among blocks included in the memory 1300 may be allocated in consideration of a P/E cycle of the memory 1300.

As an example, the storage controller 1100 may generate thermal energy of the storage device 1000a by frequently activating a memory interface for communication with the memory 1300. For example, the memory interface may be implemented to comply with standard protocols such as a Toggle or an ONFI.

In an embodiment, the storage controller 1100 may operate at a relatively fast data rate. For example, the storage controller 1100 may operate at a relatively fast data rate with the memory 1300 by changing a frequency of an internal clock signal of the storage device 1000a. The storage controller 1100 may change the frequency of the internal reference clock signal of the storage device 1000a for generating the internal clock signal or may change the frequency through a phased locked loop (PLL) or a divider. Alternatively, the frequency of an internal clock signal of the host device may be changed by the host device. Accordingly, the storage controller 1100 may operate at a relatively fast data rate with the host device and/or the memory 1300.

As an example, the storage controller 1100 may generate thermal energy of the storage device 1000a by additionally performing an Error Correction Code (ECC) encoding operation or an ECC decoding operation. To this end, the host device may intentionally insert errors into data and transmit the data to the storage device 1000a.

As described above, various embodiments of the heating operation of the storage device 1000a have been described, but the storage device 1000a is not limited to the above-described embodiments and may perform various operations to increase the temperature by generating other thermal energy in the storage device 1000a.

The storage controller 1100 continuously monitors whether the humidity value exceeds the reference humidity value, and when the humidity value exceeds the reference humidity value, the storage controller 1100a may increase the temperature of the storage device 1000a and may decrease the relative humidity of the storage device 1000a by performing the heating operation. In an embodiment, the storage controller 1100 may repeatedly perform the heating operation while monitoring the humidity value of the humidity information HI continuously received from the humidity sensor 1200 until the humidity value becomes equal to or less than the reference humidity value.

According to the above-described storage device 1000a of the present disclosure, since the humidity sensor 1200 is individually provided in the storage device 1000a instead of the host device, the storage device 1000a individually performs dynamic humidity control without the host device. Accordingly, the lifetime of the storage device 1000a may be increased and the defect rate may be reduced. In addition, by performing various heating operations with respect to the storage device 1000a through the memory 1300, the dynamic humidity control is possible without a separate heating structure (e.g., heating circuit).

Figure 2:
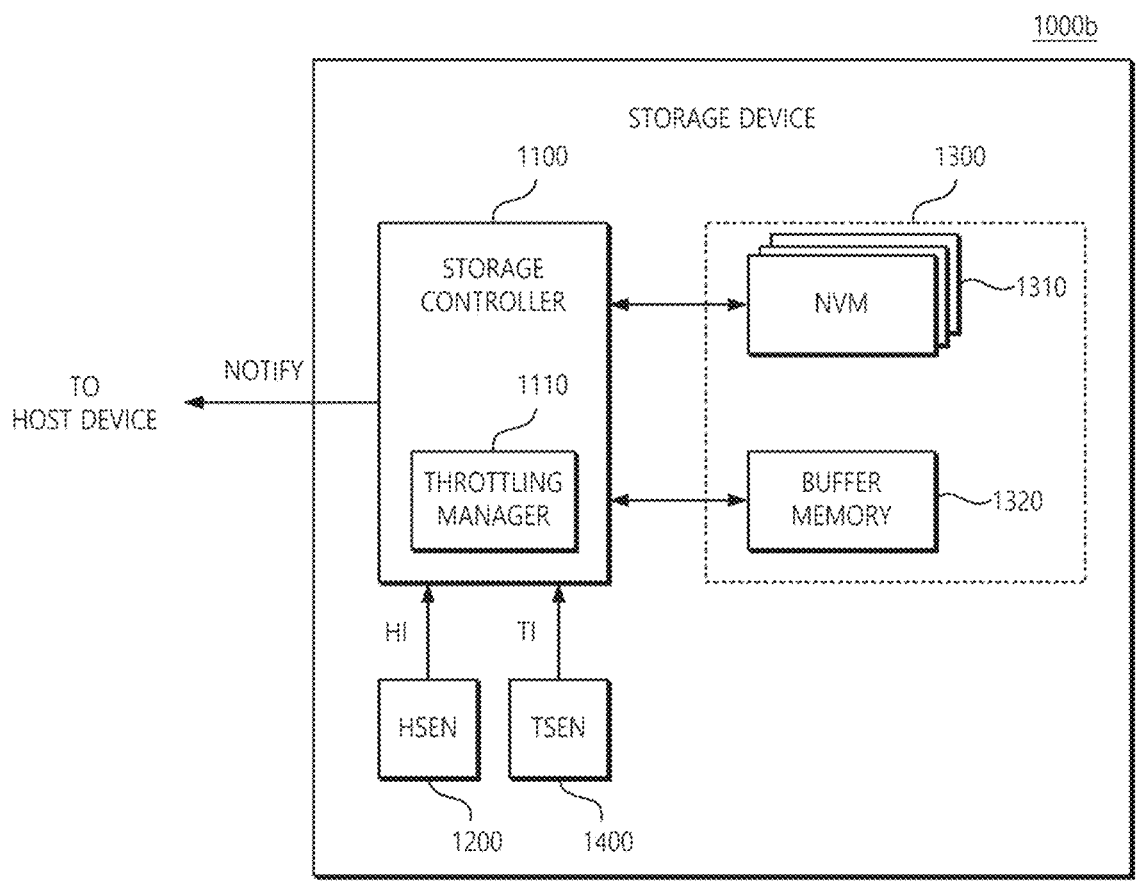
FIG. 2 illustrates a storage device, according to another embodiment of the present disclosure.

FIG. 2 illustrates a storage device, according to another embodiment of the present disclosure.

Referring to FIG. 2, a storage device 1000b according to an embodiment may further include a temperature sensor 1400 in addition to the storage controller 1100, the humidity sensor 1200, and the memory 1300.

The temperature sensor 1400 is connected to the storage controller 1100, collects temperature information TI of the storage device 1000b, and transfers the collected temperature information TI to the storage controller 1100. For example, the temperature sensor 1400 may periodically or non-periodically sense a temperature value of the storage device 1000a and may output the temperature information TI representing the sensed temperature value to the storage controller 1100.

The storage controller 1100 may include a throttling manager 1110 for performing the above-described dynamic humidity throttling or dynamic temperature throttling based on the humidity information HI and the temperature information TI received from the humidity sensor 1200 and the temperature sensor 1400, respectively.

The throttling manager 1110 may determine whether the storage controller 1100 performs the heating operation through the memory 1300 depending on the humidity information HI and the temperature information TI.

As an example, the throttling manager 1110 determines whether the humidity value of the humidity information HI exceeds a reference humidity value. When the humidity value is equal to or less than the reference humidity value, the throttling manager 1110 continuously monitors the humidity information HI. When the humidity value exceeds the reference humidity value, the throttling manager 1110 determines whether the temperature value of the temperature information TI is less than or equal to the reference temperature value. The throttling manager 1110 may determine that the storage controller 1100 performs the heating operation through the memory 1300 only when the temperature value is less than or equal to the reference temperature value.

When the temperature value of the temperature information TI exceeds the reference temperature value, the throttling manager 1110 may determine that it is difficult to control the humidity through the heating operation. Accordingly, the storage controller 1100 may notify the host device connected to the storage device 1000b that humidity control is required. In that case, the host device or a user of the host device may control the humidity of the storage device 1000b through various methods other than the above-described heating operation of the storage device 1000b.

As an example, the notification operation of the storage controller 1100 may be implemented in various software or hardware methods. For example, the notification operation may be implemented in a software method such as an Asynchronous Event Request (AER) command or in a hardware method such as a General Purpose Input/Output (GPIO).

The heating operation may be performed according to various embodiments described above. As an embodiment, the memory 1300 may include a non-volatile memory 1310 and a buffer memory 1320 as illustrated in FIG. 2. A plurality of non-volatile memories 1310 may be provided, and the non-volatile memory 1310 may be any NVM such as a NAND flash memory, a PRAM (Phase Change Random Access Memory), an RRAM (Resistance Random Access Memory), an NFGM (Nano Floating Gate Memory), a PoRAM (Polymer Random Access Memory), an MRAM (Magnetic Random Access Memory), an FRAM (Ferroelectric Random Access Memory), an EEPROM (Electrically Erasable and Programmable ROM), etc. but is not limited thereto. The buffer memory 1320 buffers data to be written to the non-volatile memory 1310 or data read from the non-volatile memory 1310. The buffer memory 1320 may be a DRAM or an SRAM.

When it is determined by the throttling manager 1110 that the heating operation is required, the storage controller 1100 may raise the temperature of the storage device 1000b through various heating operations. For example, the storage controller 1100 may increase the temperature of the storage device 1000b by repeatedly performing a read operation, a write operation, or an erase operation with respect to at least some of the non-volatile memories 1310. For example, the storage controller 1100 may repeatedly perform write buffering to dump data from the non-volatile memory 1310 or a host device to the buffer memory 1320 or read buffering to read data stored in the buffer memory 1320. As a result, the temperature of the storage device 1000b may be raised.

The above-described temperature control operation based on the temperature information TI by the throttling manager 1110 may be understood as dynamic temperature throttling, and the humidity control operation based on the humidity information HI may be understood as dynamic humidity throttling. As described above, the dynamic humidity throttling may be performed in consideration of the dynamic temperature throttling.

As an example, when the humidity value does not fall below the reference humidity value despite repeatedly performing the heating operation as the humidity value exceeds the reference humidity value, the storage controller 1100 may notify the host device connected to the storage device 1000b that a humidity control is required. For example, the storage controller 1100 may repeatedly perform the heating operation for a desired (and/or alternatively preset) time period, and when the humidity value does not fall below the reference humidity value even after the desired (and/or alternatively preset) time period has expired (e.g., the humidity value exceeds the reference humidity value when the desired and/or alternatively preset time period expires), the storage controller 1100 may notify the host device that a humidity control is required.

According to the storage device 1000b described above, the dynamic temperature throttling may be linked to the dynamic humidity throttling by considering both the humidity information HI and the temperature information TI. Accordingly, the humidity control operation may be performed while limiting heat generation to the extent of deteriorating the function of the storage device 1000b.

Hereinafter, a heating operation according to various embodiments will be described with reference to FIGS. 3A to 3C.

Figure 3A:
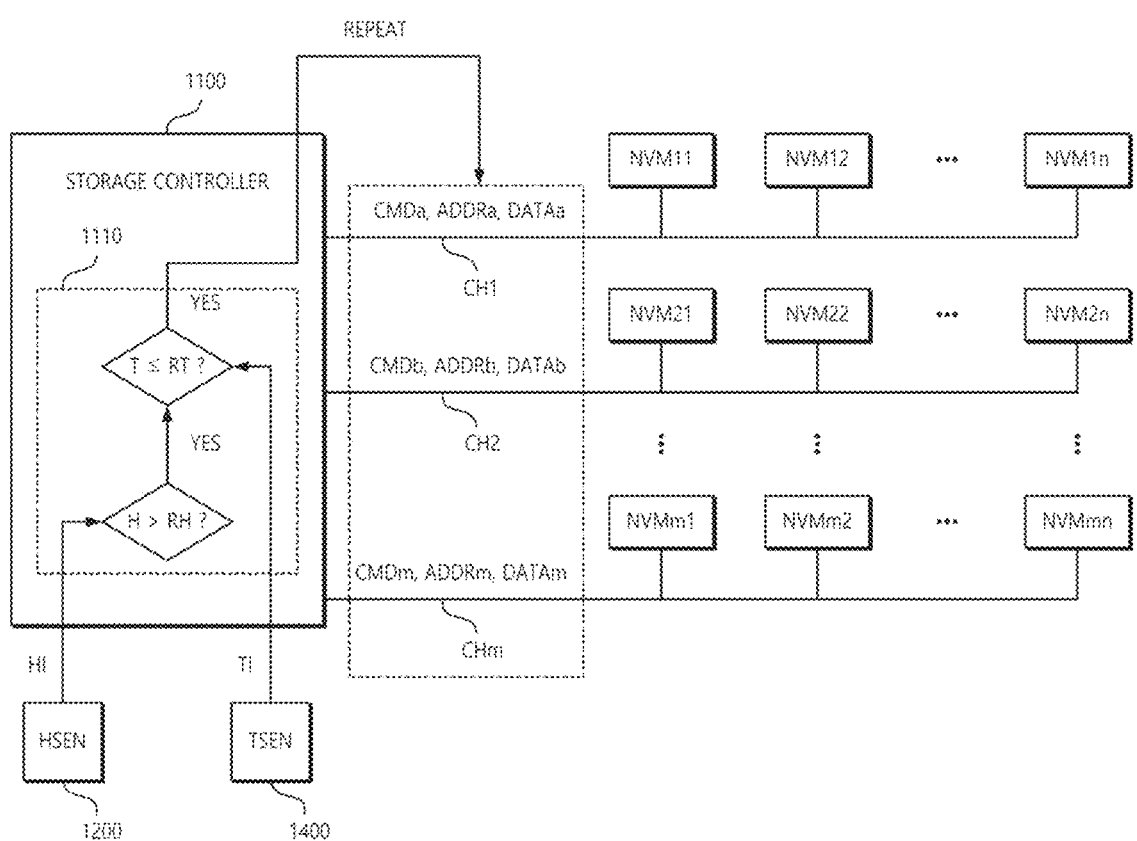
Figure 3B:
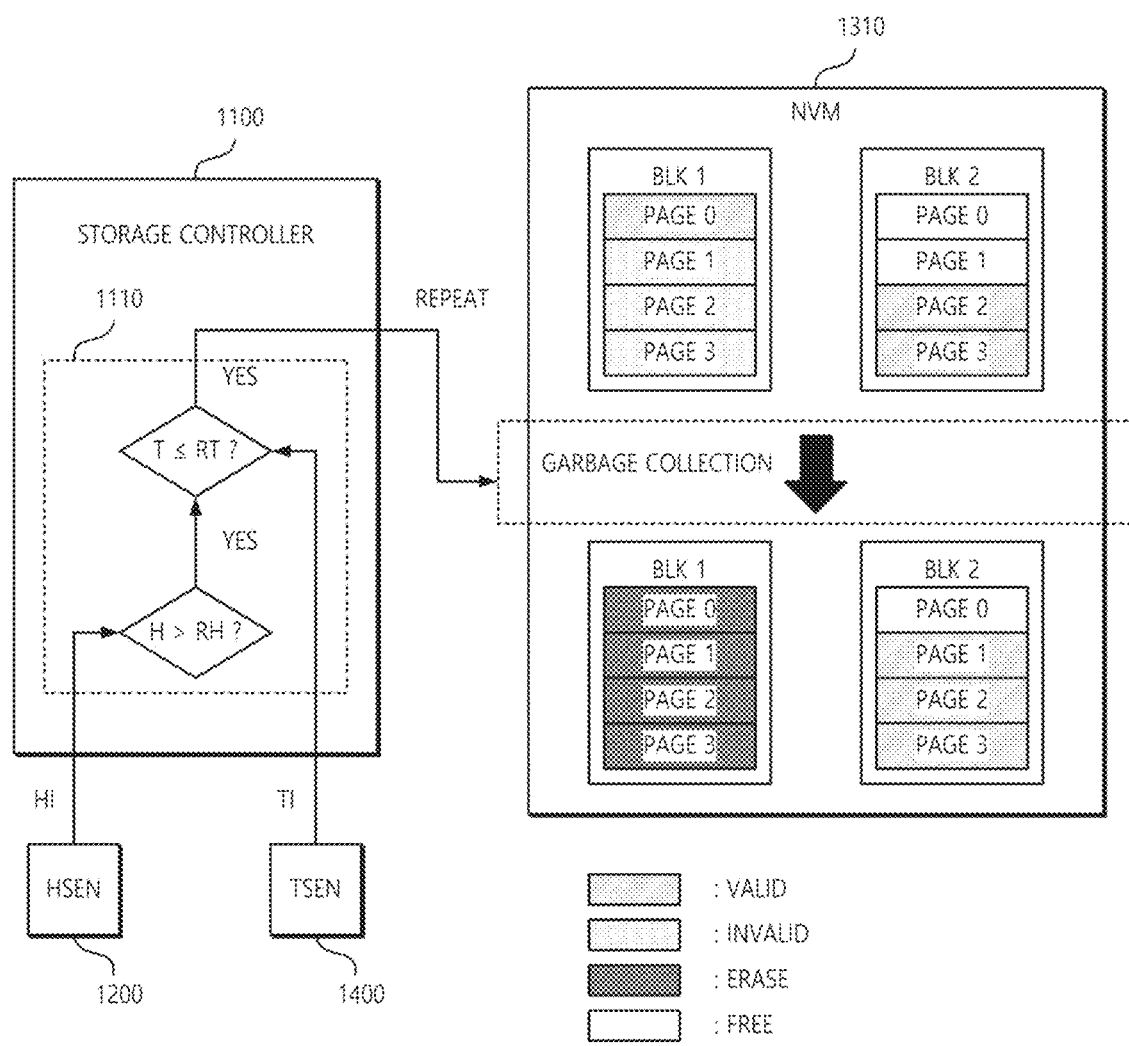

FIGS. 3A to 3C are diagrams for describing a heating operation, according to various embodiments.

First, referring to FIG. 3A, the throttling manager 1110 according to an embodiment receives the humidity information HI from the humidity sensor 1200, and determine whether the humidity value of the humidity information HI exceeds a reference humidity value RH. When it is determined that the humidity value exceeds the reference humidity value RH, the throttling manager 1110 determines whether the temperature value of the temperature information TI received from the temperature sensor 1400 is less than or equal to a reference temperature value TH. When it is determined that the temperature value is less than or equal to the reference temperature value TH, the storage controller 1100 may perform the heating operation through the non-volatile memories connected to the storage controller 1100 through channels CH1, CH2, and CHm.

The storage controller 1100 transmits commands, addresses, and data (CMDa, ADDRa, DATAa, CMDb, ADDRb, DATAb, CMDm, ADDRm, and DATAm) to the non-volatile memories through channels CH1, CH2, and CHm, or receive data from the non-volatile memories. The storage controller 1100 may select at least one of the non-volatile memories through the channels CH1, CH2, and CHm, and may transmit/receive signals with the selected non-volatile memory.

In this case, the storage controller 1100 may repeatedly transmit or receive the commands, the addresses, and the data (CMDa, ADDRa, DATAa, CMDb, ADDRb, DATAb, CMDm, ADDRm, and DATAm) intentionally to generate heat. For example, the storage controller 1100 may raise the temperature of the storage device by repeatedly performing an operation of transmitting or receiving commands, addresses, and data to or from at least one of the non-volatile memories. At least some of the non-volatile memories may be designated in advance as memories used for the heating operation of the storage controller 1100.

For example, when NVM11 to NVM1n among the non-volatile memories are designated as memories used for the heating operation, the storage controller may repeatedly transmit the commands, the addresses, and the data (CMDa, ADDRa, and DATAa) through the first channel CH1.

Referring to FIG. 3B, the throttling manager 1110 similarly determines whether the humidity value of the humidity information HI exceeds the reference humidity value RH. When it is determined that the humidity value exceeds the reference humidity value RH, the throttling manager 1110 determines whether the temperature value of the temperature information TI is less than or equal to the reference temperature value TH. When it is determined that the temperature value is less than or equal to the reference temperature value TH, the storage controller 1100 may perform the heating operation with respect to the non-volatile memory connected to the storage controller 1100 through channels.

As an example, the storage controller 1100 may perform the garbage collection through the non-volatile memory. For convenience, as an example, it is assumed that a storage region of the non-volatile memory includes a first block BLK1 and a second block BLK2, and each block has four pages.

A first page PAGE 0 of the first block BLK1 may be a valid (VALID) region in which data may be written validly, and a second page PAGE 1 to a fourth page PAGE 3 may be an invalid region (INVALID) that becomes invalid due to repeated data writing/data erasing. In addition, the first page PAGE 0 and the second page PAGE 1 of the second block BLK2 are free regions in which data may be written, and the third page PAGE 2 and the fourth page PAGE 3 may be a valid region.

When the garbage collection is performed, data stored in the block may be rearranged. For example, when the first block BLK1 having a large number of invalid regions is determined as a source block and the second block BLK2 having a large number of free regions is determined as a destination block, data stored in the first page PAGE 0 of the first block BLK1 may be copied to the second page PAGE 1 of the second block BLK2. Therefore, since data stored in the first block BLK1 is no longer meaningful data, the storage controller 1100 may make the first block BLK1 into a writable state by erasing the first block BLK1.

As an example, the storage controller 1100 may repeatedly perform the above-described garbage collection when performing the heating operation according to dynamic humidity throttling. Although FIG. 3B illustrates one non-volatile memory and two blocks included therein, the storage controller 1100 may repeatedly perform the garbage collection with respect to other blocks or other non-volatile memories.

Referring to FIG. 3C, the throttling manager 1110 similarly determines whether the humidity value of the humidity information HI exceeds the reference humidity value RH. When it is determined that the humidity value exceeds the reference humidity value RH, the throttling manager 1110 determines whether the temperature value of the temperature information TI is less than or equal to the reference temperature value TH. When it is determined that the temperature value is less than or equal to the reference temperature value TH, the storage controller 1100 may perform the heating operation with respect to the non-volatile memory connected to the storage controller 1100 through channels.

As an embodiment, the storage controller 1100 may perform the heating operation on a reserved block BLK_RES reserved for the heating operation among a plurality of blocks BLK_RES, BLK 1, and BLK N included in the non-volatile memory. The reserved block BLK_RES may be reserved by the host device or the storage controller 1100 in advance. When performing the heating operation, the storage controller 1100 may repeatedly transmit or receive commands, addresses, and data with respect to the reserved block BLK_RES. Alternatively, the storage controller 1100 may repeatedly perform an erase operation on the reserved block BLK_RES. Although only one reserved block BLK_RES is illustrated in FIG. 3C, it is natural that a plurality of reserved blocks may be provided.

As an example, the storage controller 1100 may allocate another block as an additional reserved block when the humidity value exceeds the reference humidity value RH despite the heating operation through the reserved block BLK_RES.

Figure 4:
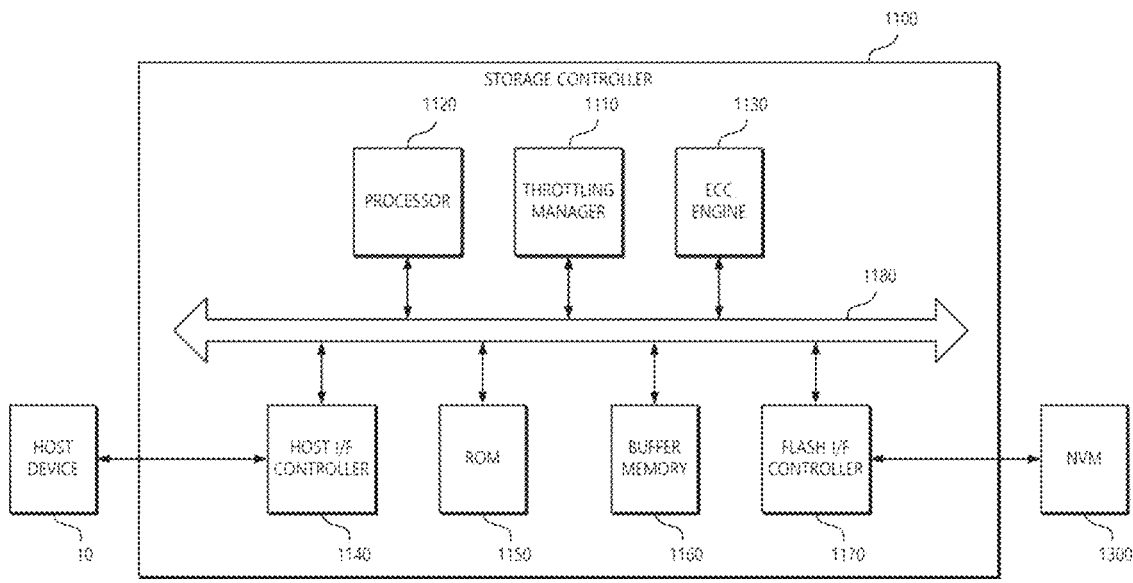
FIG. 4 illustrates a storage controller, according to an embodiment of the present disclosure.

FIG. 4 illustrates a storage controller, according to an embodiment of the present disclosure.

Referring to FIG. 4, the storage controller 1100 according to an embodiment includes the throttling manager 1110, a processor 1120, an ECC engine 1130, a host interface controller 1140, a ROM 1150, a buffer memory 1160, a flash interface controller 1170, and a bus 1180.

The processor 1120 controls overall operations of a storage device. For example, the processor 1120 may decode a command received from a host device 10 and may control the storage device to perform an operation according to the decoding result. For example, the processor 1120 may provide a read command and address to the non-volatile memory 1300 during a read operation in response to a read request, and may provide a write command, address, and data to be written to the non-volatile memory 1300 during a write operation in response to a write request.

The processor 1120 may convert a logical address received from the host device 10 into a physical page address through a flash translation layer (FTL). The processor 1120 may perform the garbage collection, address mapping, or wear leveling for managing the non-volatile memory 1300 by executing firmware loaded into the ROM 1150.

The processor 1120 may perform the dynamic humidity throttling or the dynamic temperature throttling according to the throttling manager 1110. As an example, when it is determined by the throttling manager 1110 that the humidity value of the storage device exceeds the reference humidity value RH and the temperature value is less than or equal to the reference temperature value TH, the processor 1120 may repeatedly perform a read operation, a write operation, or an erase operation with the non-volatile memory 1300 by activating the flash interface controller 1170. Alternatively, the processor 1120 may repeatedly perform an operation of buffering data transmitted from the host device 10 or the non-volatile memory 1300 in the buffer memory 1160. The processor 1120 may control the storage device to perform various other heating operations.

The ECC engine 1130 may generate a parity bit for data to be written in the non-volatile memory 1300, and the parity bit may be stored in the non-volatile memory 1300 together with the data. When corresponding data is read, the ECC engine 1130 may detect and correct errors in the read data using the parity bit.

As an embodiment, when it is determined by the throttling manager 1110 that a heating operation needs to be performed, the ECC engine 1130 may repeatedly perform the above-described operation of detecting and correcting errors in data.

The host interface controller 1140 provides an interface function between the storage device and the host device 10. Through the host interface controller 1140, the storage device may receive a command, data to be written to the non-volatile memory 1300 or other data from the host device 10, or may transmit a response to the command, data read from the non-volatile memory 1300 or other data to the host device 10. When the host interface controller 1140 is activated to transmit/receive data with the host device 10, the total power consumption of the storage device may increase and thus the temperature may rise.

The ROM 1150 may store codes and data necessary for driving the storage controller 1100. The buffer memory 1160 may buffer and store write data transmitted from the host device 10 or read data transmitted from the non-volatile memory 1300. In addition, codes and data necessary for driving the storage controller 1100 may be loaded into the buffer memory 1160 during initialization or booting of the storage device.

In FIG. 4, the ROM 1150 and the buffer memory 1160 are illustrated as being included in the storage controller 1100, but are not limited thereto. For example, the ROM 1150 and/or the buffer memory 1160 may be provided outside the storage controller 1100.

The flash interface controller 1170 provides an interface function between the storage device and the non-volatile memory 1300. The storage device may transmit data to be written to the non-volatile memory 1300 or may receive data read from the non-volatile memory 1300 through the flash interface controller 1170. When the flash interface controller 1170 is activated to transmit/receive data with the non-volatile memory 1300, the total power consumption of the storage device may increase and thus the temperature may rise.

The bus 1180 electrically connects the throttling manager 1110, the processor 1120, the ECC engine 1130, the host interface controller 1140, the ROM 1150, the buffer memory 1160, and the flash interface controller 1170 to one another, which are included in the storage controller 1100 described above. For example, an advanced microcontroller bus architecture (AMBA) protocol proposed by the ARM company may be applied to the bus 1180. Bus types of the AMBA protocol may include an Advanced High-Performance Bus (AHB), an Advanced Peripheral Bus (APB), an AXI, an AXI4, and an ACE (AXI Coherency Extensions), but are not limited thereto.

Hereinafter, various embodiments of the method of operating a storage device described above will be described.

Figure 5:
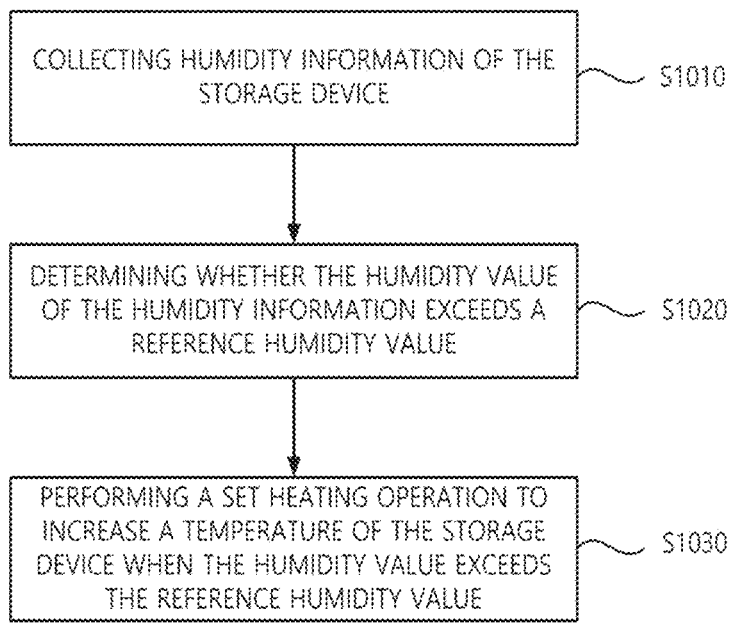
FIG. 5 is a flowchart of a method of operating a storage device, according to an embodiment of the present disclosure.

FIG. 5 is a flowchart of a method of operating a storage device, according to an embodiment of the present disclosure.

Referring to FIG. 5, in an embodiment, the storage devices 1000*a* and 1000*b* collect the humidity information HI of the storage devices 1000*a* and 1000*b* through a humidity sensor (S1010). The storage devices 1000a and 1000b may monitor a humidity value of the humidity information HI in real time.

The storage devices 1000a and 1000b determine (e.g., detect) whether the humidity value of the humidity information HI collected through operation S1010 exceeds the reference humidity value RH (S1020). Operation S1020 may be repeatedly performed according to the collection of humidity information HI.

When it is determined (e.g., detected) that the humidity value exceeds the reference humidity value RH in operation S1020, the storage devices 1000a and 1000b perform the heating operation set to increase the temperature of the storage devices 1000a and 1000b (S1030). According to various embodiments, the storage devices 1000a and 1000b may increase the temperature of the storage devices 1000a and 1000b by repeatedly performing a read operation, a write operation, or an erase operation through the memory 1300, by repeatedly performing the garbage collection for an erase operation, by frequently activating a memory interface (e.g., a flash interface controller), by operating at a relatively fast data rate, or by additionally performing an ECC encoding operation or an ECC decoding operation.

Figure 6:
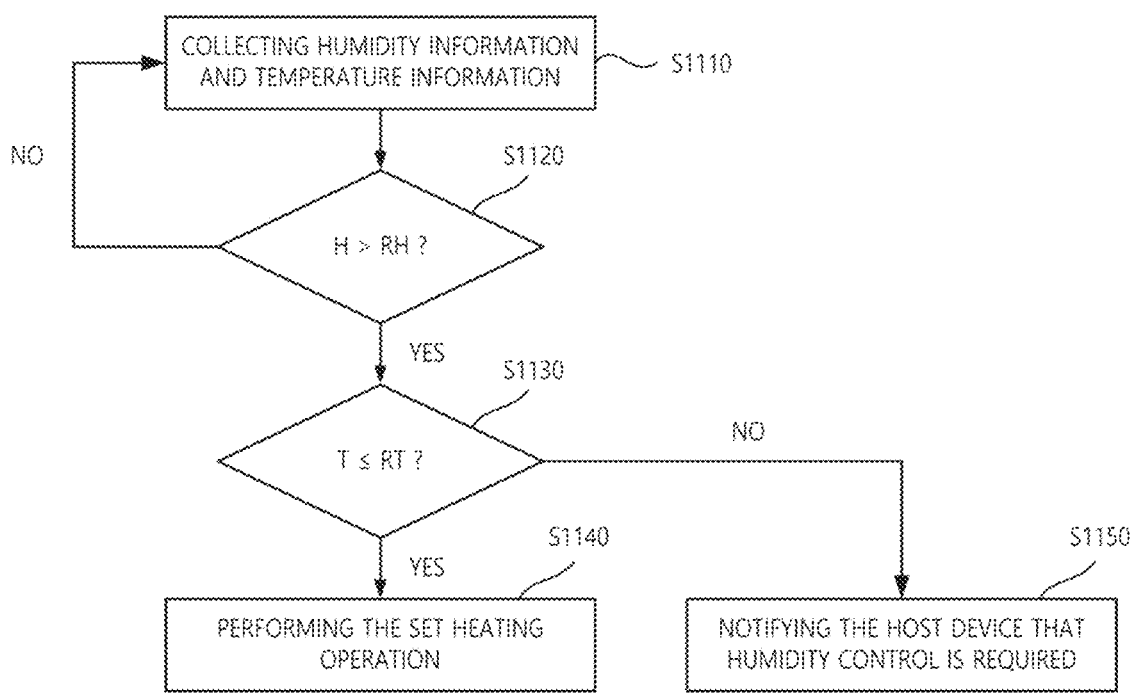
FIG. 6 is a flowchart of a dynamic humidity throttling operation of a storage device, according to an embodiment of the present disclosure.

FIG. 6 is a flowchart of a dynamic humidity throttling operation of a storage device, according to an embodiment of the present disclosure.

Referring to FIG. 6, in an embodiment, the storage devices 1000a and 1000b collect the humidity information HI and the temperature information TI of the storage devices 1000a and 1000b (S1110).

The storage devices 1000a and 1000b determine whether the humidity value of the humidity information HI exceeds the reference humidity value RH (S1120). When the humidity value is less than or equal to the reference humidity value RH, operation S1110 may be repeatedly performed.

When the humidity value exceeds the reference humidity value RH, the storage devices 1000a and 1000b determine (e.g., detect) whether the temperature value of the temperature information TI is less than or equal to the reference temperature value TH (S1130).

When the temperature value is less than or equal to the reference temperature value TH, the storage devices 1000a and 1000b perform a set heating operation (S1140).

When the temperature value exceeds the reference temperature value TH, the storage devices 1000a and 1000b notify the host device that a humidity control is required (S1150).

As an example, the storage devices 1000a and 1000b may repeatedly perform operation S1140 until the humidity value becomes equal to or less than the reference humidity value RH. For example, the storage devices 1000a and 1000b may repeatedly perform operation S1140 for a desired (and/or alternatively preset) time period. When the humidity value exceeds the reference humidity value RH when the desired (and/or alternatively preset) time period expires, the storage devices 1000a and 1000b may perform operation S1150 notifying the host device that humidity control is required.

Hereinafter, embodiments of a storage system that performs the above-described dynamic humidity throttling or the above-described dynamic temperature throttling will be described. In the present disclosure, a storage system is implemented to include the storage devices 1000a and 1000b according to various embodiments of the present disclosure, and for example, may include a server implemented as a server chassis or server rack, a data center, an edge data center, a mobile edge data center, and/or any combination thereof, and/or the like.

Figure 7:
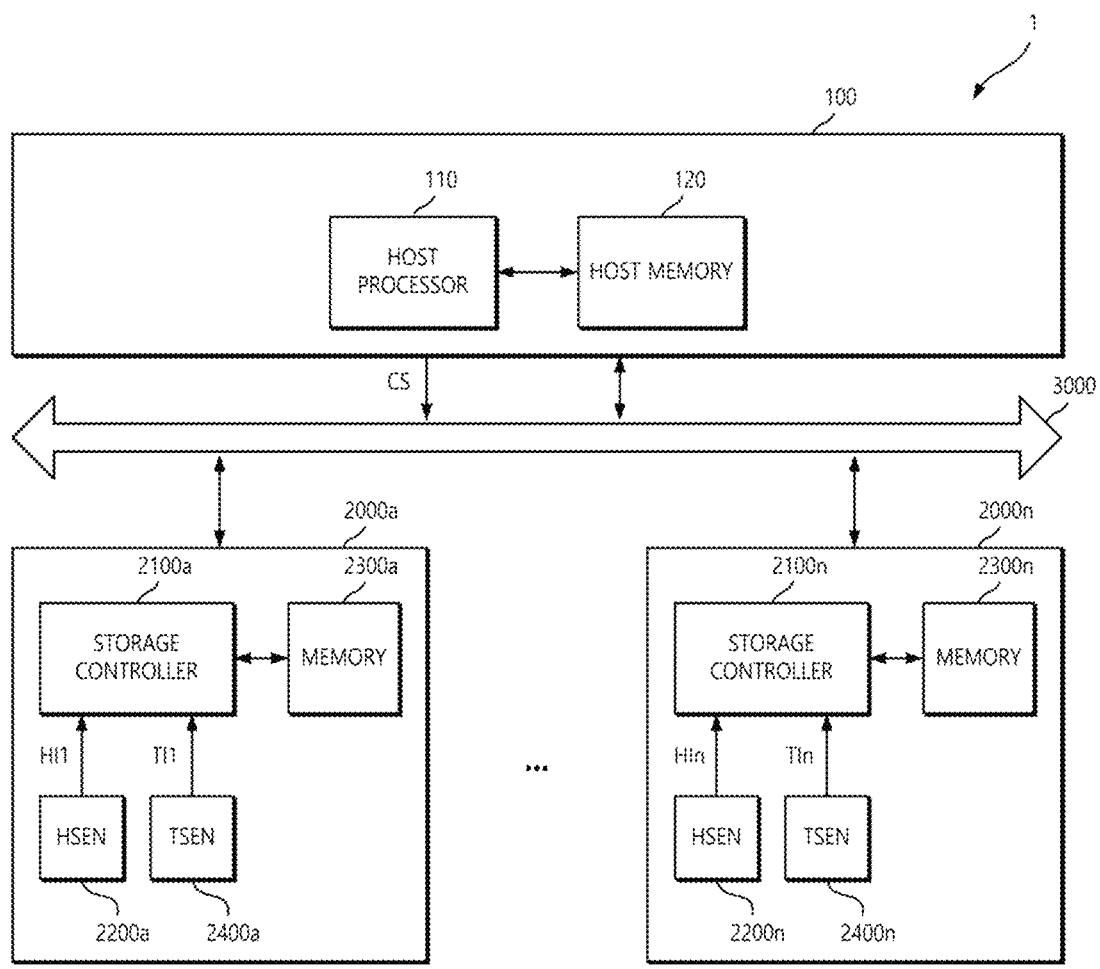
FIG. 7 illustrates a storage system, according to an embodiment of the present disclosure.

FIG. 7 illustrates a storage system, according to an embodiment of the present disclosure.

Referring to FIG. 7, a storage system 1 according to an embodiment includes a host device 100, a plurality of storage devices 2000a and 2000n connected to the host device 100, and a bus 3000. As an example, the storage system 1 of FIG. 7 may be a server.

The host device 100 is connected to the plurality of storage devices 2000a and 2000n through the bus 3000 and controls overall operations of the plurality of storage devices 2000a and 2000n. The host device 100 includes a host processor 110 and a host memory 120.

The host processor 110 may control an operation of the host device 100. For example, the host processor 110 may execute an operating system (OS) for controlling peripheral devices including the storage devices 2000a and 2000n. For example, the host processor 110 may include any processor such as a central processing unit (CPU).

The host memory 120 may store instructions and data, which are executed and processed by the host processor 110. For example, the host memory 120 may include a buffer memory and/or a non-volatile memory.

As an example, the host processor 110 may control the above-described dynamic humidity throttling or the above-described dynamic temperature throttling. The host processor 110 may receive humidity information HI1 and HIn and temperature information TI1 and TIn from the plurality of storage devices 2000a and 2000n. The host processor 110 may determine whether the dynamic humidity throttling or the dynamic temperature throttling is required for each of the plurality of storage devices 2000a and 2000n. That is, the host processor 110 may determine whether the humidity values of the received humidity information HI1 and HIn for each of the plurality of storage devices 2000a and 2000n exceed the reference humidity value RH and whether the temperature values of the received temperature information TI1 and TIn are less than or equal to the reference temperature value TH.

When at least one of the storage devices 2000a and 2000n whose the humidity value exceeds the reference humidity value RH and the temperature value is less than or equal to the reference temperature value TH is detected, the host processor 110 may allow the at least one of the storage devices 2000a and 2000n to perform the heating operation.

For example, the host processor 110 may generate a control signal CS for the at least one of the storage devices 2000a and 2000n to perform a heating operation, and the host device 100 may transmit the control signal CS. Upon receiving the control signal CS, the at least one of the storage devices 2000a and 2000n may perform the heating operation according to the various embodiments described above, based on the control signal CS.

In an embodiment, the host processor 110 may allow the host device 100 to repeatedly transmit a write command and/or a read command to the at least one of the storage devices 2000a and 2000n. The at least one of the storage devices 2000a and 2000n performs a repetitive write operation or a repetitive read operation through a memory according to a write command and/or a read command transmitted from the host device 100, thereby raising the temperature of the storage devices 2000a and 2000n.

The plurality of storage devices 2000a and 2000n are controlled by the host device 100 according to the above-described embodiments. When it is determined that at least some of the plurality of storage devices 2000a and 2000n require the dynamic humidity throttling or the dynamic temperature throttling, various heating operations may be performed under the control of the host device 100.

For example, the host device 100 receiving the first humidity information HI1 and the n-th humidity information HIn determines whether the humidity values of the first humidity information HI1 and the n-th humidity information HIn exceed the reference humidity value RH through the host processor 110, and when the humidity value of the first humidity information HI1 exceeds the reference humidity value RH, the host device 100 may allow the storage device 2000a to perform the heating operation. The storage device 2000a may repeatedly perform the heating operation through a storage controller 2100a and a memory 2300a. When the humidity value of the first humidity information HI1 exceeds the reference humidity value RH, the host device 100 may allow the storage device 2000n to perform the heating operation. The storage device 2000n may repeatedly perform the heating operation through a storage controller 2100n and a memory 2300n. As shown in FIG. 7, the storage devices 2000a and 2000n each may include a humidity sensor 2200a and 2200n and a temperature sensor 2400a and 2400n.

As an example, the host device 100 may allow the storage devices 2000a and 2000n requiring dynamic humidity throttling to repeatedly perform the heating operation for a desired (and/or alternatively preset) time period. When the humidity value exceeds the reference humidity value RH when the desired (and/or alternatively preset) time period expires, the host device 100 may stop the heating operation of the storage devices 2000a and 2000n.

In the storage system 1 according to the above-described embodiment, the host device 100 may individually control the humidity of the plurality of storage devices 2000a and 2000n. The host device 100 receives the humidity information HI1 and HIn and the temperature information TI1 and TIn for each of the storage devices 2000a and 2000n, and controls the heating operation to be performed individually accordingly, so that the lifespan and failure rate of the entire storage system 1 may be improved.

The storage system 1 according to an embodiment may assign an address to each of the plurality of storage devices 2000a and 2000n included in the storage system 1 to manage each of the plurality of storage devices 2000a and 2000n. For example, when the bus 3000 is an SMBus, the host device 100 may allocate an address for each of the storage devices 2000a and 2000n using an Address Resolution Protocol (ARP).

According to an embodiment, when the host device 100 performs the ARP, each of the storage devices 2000a and 2000n receives an ARP-related message through the bus 3000 and individually receives an address based on the ARP-related message. For example, when the ARP-related message includes an ARP command, the storage devices 2000a and 2000n may determine whether the corresponding ARP command corresponds to an 'Assign Address'. When the corresponding ARP command is the 'Assign Address', the storage devices 2000a and 2000n may determine whether their pre-assigned Unique Device Identifier (UDID) matches the UDID included in the ARP-related message. When the UDIDs match each other, the storage devices 2000a and 2000n may receive addresses corresponding to the corresponding UDID.

As an example, the host device 100 may map the physical location of each of the storage devices 2000a and 2000n when allocating an address to each of the plurality of storage devices 2000a and 2000n through the ARP. Accordingly, each of the storage devices 2000a and 2000n may receive an address to which its physical location is mapped.

In an embodiment, the host device 100 assigns an address to which a physical location is mapped to each of the plurality of storage devices 2000a and 2000n through the ARP, thereby managing the plurality of storage devices 2000a and 2000n for each physical location. The host device 100 may manage a task such as the heating operation for each physical location of the plurality of storage devices 2000a and 2000n. For example, the host device 100 may allow a storage device located in a specific area to perform the heating operation. For example, the host device 100 may change tasks assigned to each of the plurality of storage devices 2000a and 2000n in consideration of physical locations.

In an embodiment, the host device 100 may provide the humidity information HI and/or the temperature information TI of the storage device to an air conditioning system associated with a storage device located in a specific area, or may operate the air conditioning system for each physical location.

In an embodiment, the host device 100 may generate and manage a temperature and humidity management log based on the humidity information HI and the temperature information TI received from the humidity sensor 1200 and/or the temperature sensor 1400, may predict and manage defects of the plurality of storage devices 2000a and 2000n based on the temperature and humidity management log, and may guide a maintenance time ac cording to the defects. For example, the host device 100 may predict defects based on various artificial intelligence-based prediction techniques such as machine learning or trends in data included in the temperature and humidity management log. For example, when defects of the storage device are predicted, the host device 100 may calculate the maintenance time based on the temperature and humidity management log.

Figures 8, 9:
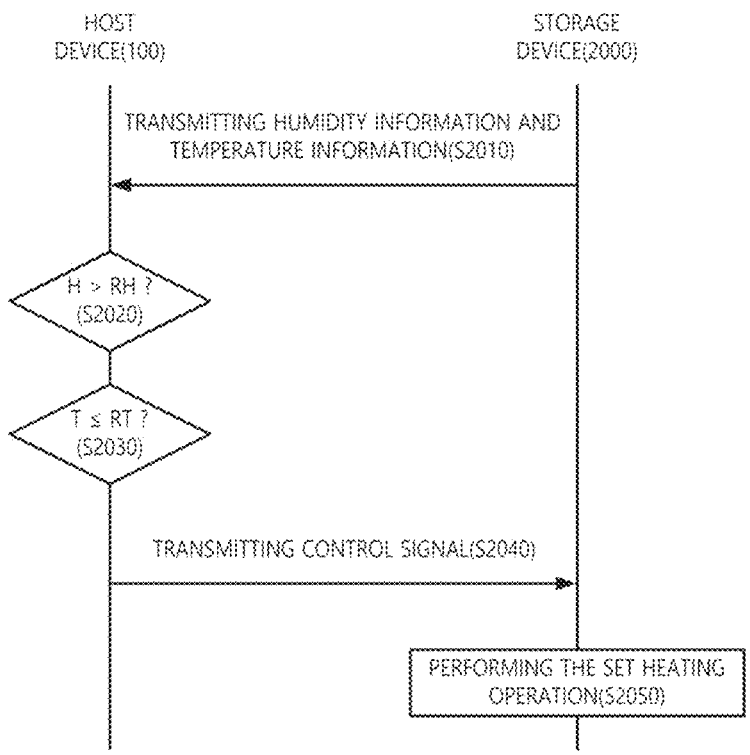
FIG. 8 is a diagram for describing an address assignment operation by a storage system, according to an embodiment.
FIG. 9 is a diagram for describing a method of operating a storage system, according to an embodiment of the present disclosure.

FIG. 8 is a diagram for describing an address assignment operation by a storage system, according to an embodiment.

Referring to FIG. 8, the storage system 1 according to an embodiment may map an address to a physical location for each of the plurality of storage devices 2000a and 2000n through ARP, and may assign the corresponding address for each of the storage devices 2000a and 2000n. As illustrated in FIG. 8, the storage system 1 may manage an ARP table in which ARP addresses and physical locations for each of the storage devices 2000a and 2000n are mapped.

The storage system 1 may individually control the heating operation of the storage devices 2000a and 2000n based on the assigned address. The storage devices 2000a and 2000n to which addresses are assigned may perform the dynamic humidity throttling or the dynamic temperature throttling by themselves according to the above-described embodiments. Alternatively, the storage devices 2000a and 2000n may perform the dynamic humidity throttling or the dynamic temperature throttling according to the control of the host device 100.

For example, the first to third storage devices may receive first to third addresses ADDRESS_1 to ADDRESS_3 and first to third location information PL_1 to PL_3 mapped thereto, which are assigned respectively. In this case, when the heating operation of the second storage device is required as the humidity value of the humidity information of the second storage device exceeds the reference humidity value RH, the host device 100 may transmit various signals required for the heating operation through the second address ADDRESS_2 which is assigned to the second storage device. In addition, the host device 100 may immediately check the physical location PL_2 of the second storage device.

As described above, when the storage devices 2000a and 2000n perform the dynamic humidity throttling or the dynamic temperature throttling by themselves, the storage devices 2000a and 2000n may notify the host device 100 that a humidity control is required when the humidity value does not fall below the reference humidity value RH despite the heating operation. The host device 100 may immediately check the physical locations of the storage devices 2000a and 2000n notifying that humidity control is necessary through the ARP table. Then, the host device 100 or a user of the host device 100 may control the humidity of the storage devices 2000a and 2000n by using various methods other than the above-described heating operation of the storage device 2000a or 2000n according to the physical location of the storage device 2000a or 2000n in which humidity is a problem.

FIG. 9 is a diagram for describing a method of operating a storage system, according to an embodiment of the present disclosure.

Referring to FIG. 9, in the storage system 1 according to an embodiment, the storage devices 2000a and 2000n transmit the collected humidity information HI and the collected temperature information TI to the host device 100 (S2010).

The host device 100 determines (e.g., detects) whether the humidity value of the collected humidity information HI exceeds the reference humidity value RH (S2020).

When the humidity value of the humidity information HI exceeds the reference humidity value RH, the host device 100 determines (e.g., detects) whether the temperature value of the collected temperature information TI is less than or equal to the reference temperature value TH (S2030). In addition, when the humidity value of the collected humidity information HI is less than or equal to the reference humidity value RH, the host device 100 may continuously receive the humidity information HI and the temperature information TI from the storage devices 2000a and 2000n.

When the temperature value is less than or equal to the reference temperature value TH, the host device 100 generates the control signal CS for the storage devices 2000a and 2000n to perform the heating operation and transmits the control signal CS to the storage devices 2000a and 2000n (S2040). As an example, the host device 100 may repeatedly transmit a command for a repetitive write operation, a repetitive read operation, or a repetitive erase operation to the storage devices 2000a and 2000n.

The storage devices 2000a and 2000n perform the heating operation based on the control signal CS (S2050). In spite of the heating operation in operation S2050, when the humidity value does not fall below the reference humidity value RH, the host device 100 may stop the heating operation.

Figure 10:
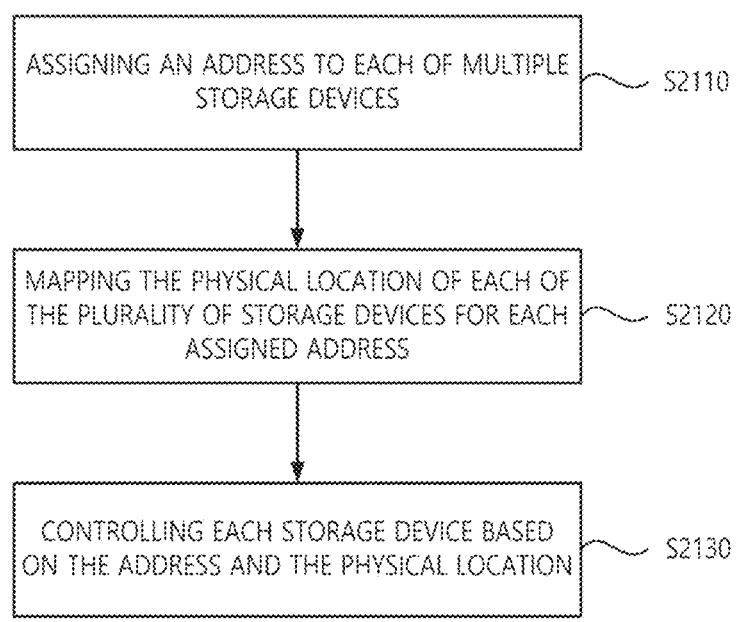
FIG. 10 is a diagram for describing an operating method of a host device included in a storage system, according to another embodiment of the present disclosure.

FIG. 10 is a diagram for describing an operating method of a host device included in a storage system, according to another embodiment of the present disclosure.

Referring to FIG. 10, as another embodiment, the host device 100 included in the storage system 1 may assign an address to each of the plurality of storage devices 2000a and 2000n (S2110). For example, the host device 100 may assign the ARP address based on the ARP.

The host device 100 may map the physical location of each of the plurality of storage devices 2000a and 2000n for each assigned address (S2120). Through operation S2120, the ARP table in which physical locations are mapped for each address may be created.

The host device 100 may control each of the storage devices 2000a and 2000n based on the addresses and physical locations assigned through operations S2110 and S2120 (S2130). For example, when humidity values measured from at least some of the plurality of storage devices 2000a and 2000n exceed the reference humidity value, the host device 100 may transmit the control signal for performing the heating operation with the addresses of at least some of the storage devices 2000a and 2000n.

Figure 11:
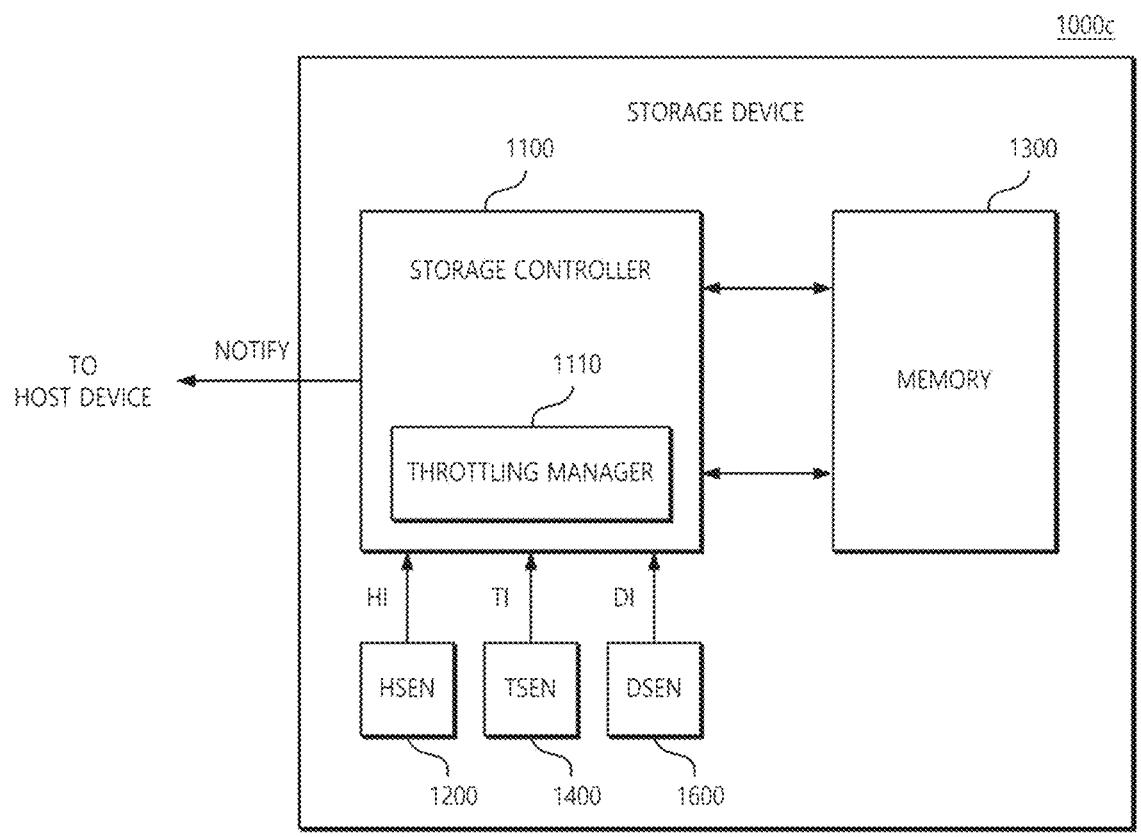
FIG. 11 illustrates a storage device, according to another embodiment of the present disclosure.

FIG. 11 illustrates a storage device, according to another embodiment of the present disclosure.

Referring to FIG. 11, a storage device 1000c according to another embodiment may further include a condensation sensor 1600 in addition to the storage controller 1100, the humidity sensor 1200, the temperature sensor 1400, and the memory 1300.

The condensation sensor 1600 is connected to the storage controller 1100, collects condensation information DI indicating whether condensation occurs in the storage device 1000c, and transmits the collected condensation information DI to the storage controller 1100.

The throttling manager 1110 may determine whether the storage controller 1100 performs the heating operation through the memory 1300 according to the condensation information DI in addition to the humidity information HI and the temperature information TI.

In an embodiment, when any one of a condition in which the humidity value of the humidity information HI exceeds the reference humidity value and a condition in which it is determined that condensation occurs according to the condensation information DI is satisfied, the throttling manager 1110 determines whether the temperature value of the temperature information TI is equal to or less than the reference temperature value. The throttling manager 1110 may determine that the storage controller 1100 performs the heating operation through the memory 1300 only when the temperature value is less than or equal to the reference temperature value.

When the temperature value of the temperature information TI exceeds the reference temperature value, the need for humidity control may be notified to the host device as in the above-described embodiments.

Figure 12:
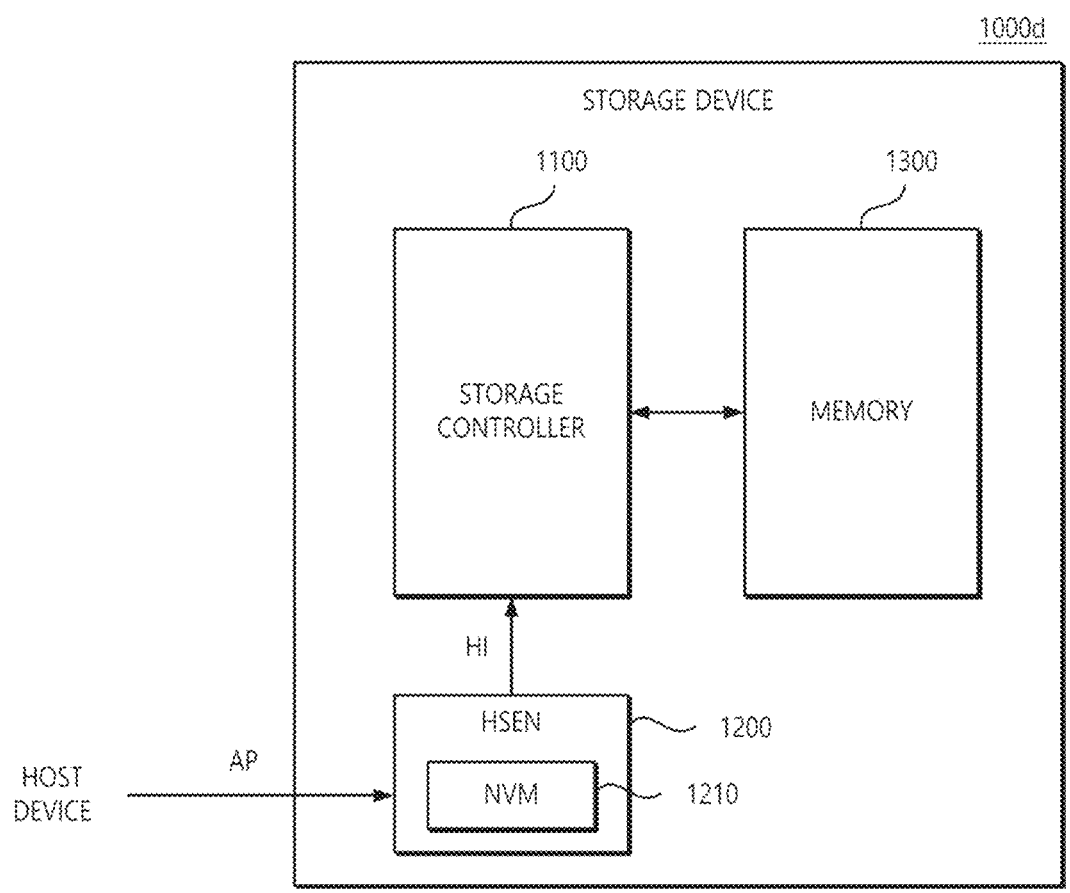
FIG. 12 illustrates a storage device, according to another embodiment of the present disclosure.

FIG. 12 illustrates a storage device, according to another embodiment of the present disclosure.

Referring to FIG. 12, a storage device 1000d according to another embodiment includes the storage controller 1100, the humidity sensor 1200, and the memory 1300, but the humidity sensor 1200 may further include a separate NVM 1210.

The humidity sensor 1200 according to an embodiment may store humidity information HI by itself by including the separate NVM 1210. The humidity sensor 1200 may transfer the humidity information HI stored by itself to the storage controller 1100 according to a command of the storage controller 1100.

Also, the humidity sensor 1200 according to an embodiment may receive an auxiliary power source AP from a host device. For example, the humidity sensor 1200 may receive the auxiliary power source AP from a host device through a Peripheral Component Interconnect Express (PCIe) interface such as a 3.3V_AUX pin. In this case, the humidity sensor 1200 may perform a sensing operation of the humidity information HI and a storing operation for storing the sensed humidity information HI into the NVM 1210 using the auxiliary power source AP supplied from the host device without applying power from the storage device 1000d.

Figure 13:
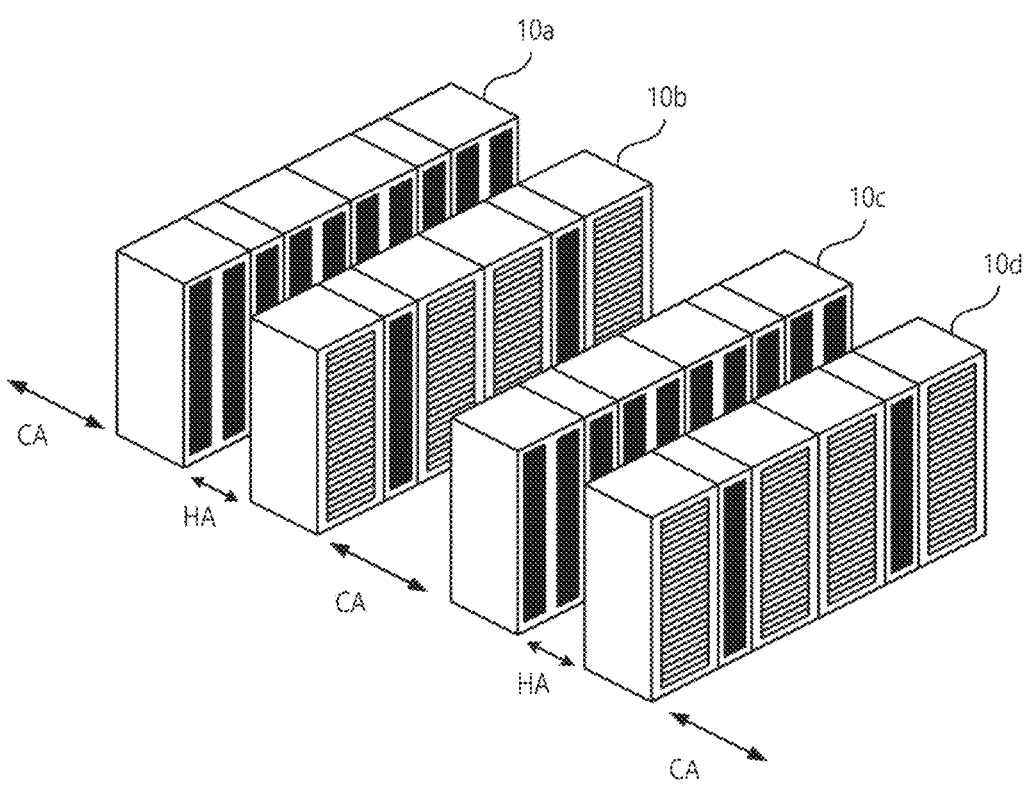
FIG. 13 is a diagram illustrating a storage system as an example.

FIG. 13 is a diagram illustrating a storage system as an example.

Referring to FIG. 13, the storage system may include a plurality of server racks 10*a* to 10*d*. As an example, the storage system of FIG. 13 may be a data center. The storage system may be implemented to maintain a temperature or humidity within an appropriate range according to an air conditioning system. Each of the server racks 10*a* to 10*d* may be positioned such that a cold air passage CA and a hot air passage HA are formed. For example, the cold air passage CA may be formed in regions where the front surfaces of the server racks 10*a* to 10*d* face each other, and the hot air passage HA may be formed in regions where the rear surfaces of the server racks 10*a* to 10*d* face each other.

In this way, regions with different temperatures or humidity coexist in the storage system according to locations of individual components such as the server racks 10*a* to 10*d* included in the storage system. In addition, there is a possibility that a weak region not managed by the air conditioning system exists. Accordingly, defects such as dust, moisture absorption, or corrosion may occur in each of the server racks 10*a* to 10*d* individually depending on the location.

Figure 14:
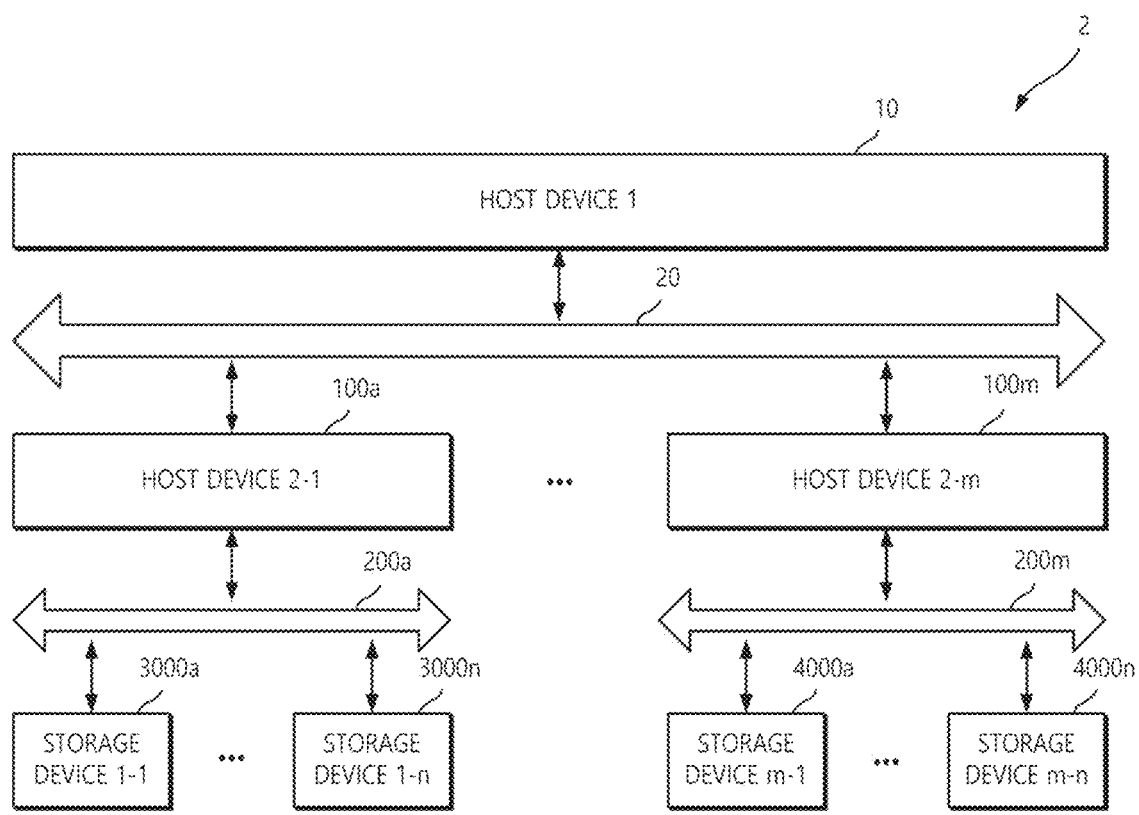
FIG. 14 illustrates a storage system, according to another embodiment of the present disclosure.

FIG. 14 illustrates a storage system, according to another embodiment of the present disclosure.

Referring to FIG. 14, in another embodiment, a storage system 2 includes a first host device 10, a plurality of second host devices 100*a* and 100*m*, and a plurality of storage devices 3000*a*, 3000*n*, 4000*a*, and 4000*n* connected to each of the plurality of second host devices 100*a* and 100*m*.

The first host device 10 controls overall operations of the plurality of second host devices 100*a* and 100*m* connected to a first bus 20. For example, the first host device 10 may be a data center. The plurality of second host devices 100*a* and 100*m* control overall operations of the plurality of storage devices 3000*a*, 3000*n*, 4000*a*, and 4000*n* respectively connected to the second host devices 100*a* and 100*m* through second buses 200*a* and 200*m*. For example, the second host devices 100*a* and 100*m* may be servers.

In an embodiment, the plurality of storage devices 3000*a*, 3000*n*, 4000*a*, and 4000*n* may operate the dynamic humidity throttling and the dynamic temperature throttling according to the above-described embodiments based on a control of the first host device 10 or the second host devices 100*a* and 100*m*.

The second host devices 100*a* and 100*m* may receive the humidity information HI and the temperature information TI from the plurality of storage devices 3000*a*, 3000*n*, 4000*a*, and 4000*n* respectively connected thereto. The second host devices 100*a* and 100*m* may collect and transmit the humidity information HI and the temperature information TI to the first host device 10.

The first host device 10 may control the above-described dynamic humidity throttling or the dynamic temperature throttling based on the received humidity information HI and temperature information TI. The first host device 10 may determine whether the dynamic humidity throttling or the dynamic temperature throttling is required for each of the plurality of second host devices 100*a* and 100*m* and for each of the plurality of storage devices 3000*a*, 3000*n*, 4000*a*, and 4000*n* respectively connected thereto. That is, the first host device 10 may determine whether the humidity value of the received humidity information HI for each of the plurality of storage devices 3000*a*, 3000*n*, 4000*a*, and 4000*n* exceeds the reference humidity value RH and may determine whether the temperature value of the received temperature information TI for each of the plurality of storage devices 3000*a*, 3000*n*, 4000*a*, and 4000*n* is equal to or less than the reference temperature value TH.

When at least one storage device of which the humidity value exceeds the reference humidity value RH and of which the temperature value is less than or equal to the reference temperature value TH is detected, the first host device 10 may allow the corresponding storage device to perform the heating operation through the second host devices 100*a* and 100*m* in which the corresponding storage device is detected.

For example, when it is determined that the humidity value of the 1-1st storage device 3000*a* exceeds the reference humidity value RH and the temperature value of the 1-1st storage device 3000*a* is less than or equal to the reference temperature value TH, the first host device 10 may allow the 1-1st storage device 3000*a* to perform the heating operation through the 2-1st host device 100*a*.

In an embodiment, the first host device 10 may allow the second host devices 100*a* and 100*m* to repeatedly transmit a write command and/or a read command to at least one storage device. At least one storage device performs a repetitive write operation or a repetitive read operation through the memory according to a write command and/or a read command transmitted from the first host device 10 and the second host devices 100*a* and 100*m*, thereby raising a temperature of the storage device.

As an example, the first host device 10 may allow a storage device requiring the dynamic humidity throttling to repeatedly perform the heating operation for a predetermined time period. When the humidity value exceeds the reference humidity value RH when the desired (and/or alternatively preset) time period expires, the first host device 10 may stop the heating operation of the storage device requiring the dynamic humidity throttling. In this case, the first host device 10 may adjust an air conditioning system to increase the temperature of a region where the storage device having a humidity problem is located, or may perform other humidity control operations.

As an example, the first host device 10 or the second host devices 100*a* and 100*m* may map addresses of the plurality of storage devices to physical locations and may allocate corresponding addresses to each storage device.

The first host device 10 may individually control the heating operation of the storage device based on the assigned address. The storage device to which the address is allocated may perform the dynamic humidity throttling or the dynamic temperature throttling by itself according to the above-described embodiments, or may perform the dynamic humidity throttling or the dynamic temperature throttling according to the control of a host device. Accordingly, even if each of the plurality of second host devices 100*a* and 100*m* has different environmental conditions due to the different locations provided within the data center, the first host device 10 may individually control the humidity and the temperature of the plurality of second host devices 100*a* and 100*m* and the plurality of storage devices connected to each of the second host devices 100*a* and 100*m* depending on locations.

Alternatively, in an embodiment, the plurality of storage devices may perform the dynamic humidity throttling or the dynamic temperature throttling by themselves. Even though the storage device performs the dynamic humidity throttling or the dynamic temperature throttling by itself, when the humidity value does not fall below the reference humidity value RH, the plurality of storage devices may notify the second host devices 100*a* and 100*m* that the humidity control is required. The second host devices 100*a* and 100*m* may again notify the first host device 10 that the humidity control is required. In this case, the first host device 10 may adjust an air conditioning system to increase the temperature of a region where the storage device is located, or may perform other humidity control operations.

According to an embodiment of the present disclosure, a storage device capable of controlling humidity for each storage device, a storage system including the same, and a method of operating the same may be provided.

One or more of the elements disclosed above may include or be implemented in processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In example embodiments, the humidity sensor 1200 may include or be implemented in a humidity sensor circuit, an electronic hygrometer, or the like, the temperature sensor 1400 may include or be implemented using a temperature sensing circuit, and the condensation sensor 1600 may include or be implemented using a condensation-measurement circuit, but example embodiments are not limited thereto.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
a non-volatile memory;
a buffer memory configured to buffer data to be written to the non-volatile memory or data read from the non-volatile memory;
a humidity sensor configured to collect humidity information of the storage device; and
a storage controller configured to perform a heating operation set to increase a temperature of the storage device through at least one of the non-volatile memory or the buffer memory if a humidity value of the humidity information exceeds a reference humidity value,
the heating operation including at least one of an operation of dumping data stored in the buffer memory to the non-volatile memory and an operation of performing one or more of a write, a read, or an erase through the non-volatile memory,
wherein the storage controller is configured to perform the heating operation using the at least one of the non-volatile memory or the buffer memory without using a separate heating structure.

2. The storage device of claim 1, further comprising:
a temperature sensor configured to collect temperature information of the storage device.

3. The storage device of claim 2, wherein the storage controller is configured to perform the heating operation only if a temperature value of the temperature information is less than or equal to a reference temperature value.

4. The storage device of claim 2, wherein the storage controller is configured to notify a host device connected to the storage device that a humidity control is required if a temperature value of the temperature information exceeds a reference temperature value.

5. The storage device of claim 1, wherein the storage device is configured to receive an address mapped to a physical location of the storage device from a host device connected to the storage device.

6. The storage device of claim 5, wherein the heating operation is controlled through the host device connected to the storage device for each physical location.

7. The storage device of claim 1, wherein the storage controller is configured to repeatedly perform the heating operation until the humidity value is equal to or less than the reference humidity value.

8. The storage device of claim 7, wherein
the storage controller is configured to repeatedly perform the heating operation for a time period, and
the storage controller is configured to notify a host device connected to the storage device that a humidity control is required if the humidity value exceeds the reference humidity value and the time period is expired.

9. A method of operating a storage device, the method comprising:
collecting humidity information of the storage device;
determining whether a humidity value of the humidity information exceeds a reference humidity value; and
performing a heating operation set to increase a temperature of the storage device if the humidity value exceeds the reference humidity value, wherein
the storage device includes a buffer memory and non-volatile memory,
the heating operation is performed using at least one of the non-volatile memory or the buffer memory without using a separate heating structure, and
the heating operation includes at least one of an operation of dumping data stored in the buffer memory to the non-volatile memory and an operation of performing one or more of a write, a read, or an erase through the non-volatile memory.

10. The method of claim 9, further comprising:
collecting temperature information of the storage device.

11. The method of claim 10, further comprising:
determining whether a temperature value of the temperature information is less than or equal to a reference temperature value, wherein
the performing the heating operation is performed only if the temperature value is equal to or less than the reference temperature value.

12. The method of claim 11, further comprising:
if the temperature value of the temperature information exceeds the reference temperature value, notifying a host device connected to the storage device that a humidity control is required.

13. The method of claim 9, further comprising:
receiving an address mapped to a physical location of the storage device from a host device connected to the storage device.

14. The method of claim 9, wherein the performing the heating operation is repeatedly performed until the humidity value is less than the reference humidity value.

15. A storage system comprising:
a plurality of storage devices each including
a non-volatile memory, a buffer memory configured to buffer data to be written to the non-volatile memory or data read from the non-volatile memory, a humidity sensor configured to collect humidity information of the plurality of storage devices, and a storage controller configured to perform a heating operation set to increase a temperature of a storage device among the plurality of storage devices through at least one of the non-volatile memory or the buffer memory if a humidity value of the humidity information exceeds a reference humidity value, and wherein the storage controller is configured to perform the heating operation using the at least one of the non-volatile memory or the buffer memory without using a separate heating structure, the heating operation includes at least one of an operation of dumping data stored in the buffer memory to the non-volatile memory and an operation of performing one or more of a write, a read, or an erase through the non-volatile memory; and a host device configured to control the plurality of storage devices.

16. The storage system of claim 15, wherein each of the plurality of storage devices further includes a temperature sensor configured to collect temperature information of the plurality of storage devices.

17. The storage system of claim 16, wherein the plurality of storage devices are configured to transfer the humidity information and the temperature information to the host device, and the host device is configured to determine whether the humidity value exceeds the reference humidity value and whether a temperature value of the temperature information is less than or equal to a reference temperature value.

18. The storage system of claim 17, wherein the host device is configured to allow at least one of the plurality of storage devices to perform the heating operation if the humidity value exceeds the reference humidity value and the temperature value is less than or equal to the reference temperature value.

19. The storage system of claim 15, wherein the host device is configured to assign an address mapped to a physical location of a corresponding one of the plurality of storage devices to the corresponding one of the plurality of storage devices, and the host device is configured to control the heating operation of the plurality of storage devices for physical locations corresponding to the plurality of storage devices.

20. The storage system of claim 19, wherein the storage controller is configured to repeatedly perform the heating operation for a time period, and the host device is configured to stop the heating operation of at least one of the plurality of storage devices when the humidity value exceeds the reference humidity value and the time period is expired.

* * * * *